XR 3,743,417

SEARCH ROOM

United States Patent [19]

Smatlak

SUBSTITUTE FOR MISSING XR

[11] 3,743,417

[45] July 3, 1973

[54] DURABLE TRANSPARENT MASK FOR PHOTOLITHOGRAPHICAL PROCESSING AND METHOD OF MAKING THE SAME

[75] Inventor: Charles J. Smatlak, Irwin, Pa.

[73] Assignee: Westinghouse Electric Corporation, Pittsburgh, Pa.

[22] Filed: July 13, 1971

[21] Appl. No.: 162,038

Related U.S. Application Data

[62] Division of Ser. No. 844,141, July 23, 1969, abandoned.

[52] U.S. Cl. .................... 355/125, 355/133

[51] Int. Cl. .................... G03b 27/28

[58] Field of Search .................... 355/125, 133

[56] References Cited

UNITED STATES PATENTS 3,507,592 4/1970 McLaughlin .................... 355/125 X 3,519,348 7/1970 McLaughlin .................... 355/133

*Primary Examiner*—Samuel S. Matthews

*Assistant Examiner*—Richard M. Sheer

*Attorney*—F. Shapoe and C. L. Menzemer et al.

[57] ABSTRACT

An indefinitely reusable transparent mask suitable for photolithographic uses, particularly for the production of semiconductor elements preferably embodies a visually transparent image fused at least part way into a durable transparent substrate such as glass. The image being of a material capable of absorbing a selected range of wavelengths of the light spectrum, and particularly in the ultraviolet range, the image being of a contrasting color to the substrate. The image may also be visually opaque provided it at least absorbs a desired range of wavelengths of the light spectrum.

6 Claims, 6 Drawing Figures

Figure 1:
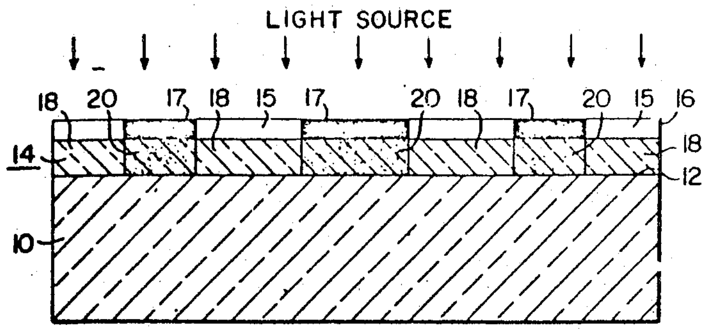

DURABLE TRANSPARENT MASK FOR PHOTOLITHOGRAPHICAL PROCESSING AND METHOD OF MAKING THE SAME

CROSS REFERENCE TO RELATED APPLICATIONS

This application is a division of application Ser. No. 844,141, filed July 23, 1969 now abandoned the assignee of which is the same as that of the present application.

BACKGROUND OF THE INVENTION

1. Field of the Invention

This invention relates to photolithographic processing, particularly for semiconductor electrical devices, and specifically to producing and using durable, visually transparent masks to be employed in the manufacture of devices by photolithography.

2. Description of the Prior Art

Heretofore, masks employed in assisting in the selective etching and diffusion of semiconductor materials in the manufacture of semiconductor electrical devices have been either metal masks or more commonly, photo-emulsion masks. Either one of these masks is predominantly opaque except where openings are present, this characteristic makes it difficult for an operator to align such a mask in relation to one or more patterns already present on the semiconductor material. Reworking of the patterns on the semiconductor wafer very often is required because of misalignment of one or more masks with respect to a previously produced feature. Sometimes the processed wafer must be scrapped at a considerable economic loss because of mask misalignment.

Additionally, either of the prior art masks is readily damaged, the photo-emulsion mask being the most easily damaged by scratching. Photo-emulsion masks have a very short lifetime and may easily be damaged beyond repair sometimes without even being used once, as can happen should the emulsion be inadvertently scratched while placing it carelessly in a holder to be used for the first time. Additionally, both prior art masks become dirty easily. The photo-emulsion mask is most generally not conducive to being cleaned and usually it is most often discarded when dirty. The metal mask requires a tedious cleaning operation particularly when cleaning the buildup of photoresist from corners without scratching the mask or ruining the definition of the profile image.

An object of this invention is to provide a glass mask suitable for use in photolithographic processes such as are employed in making semiconductor electrical devices, the mask having the capability of resisting scratching and being readily cleaned by most known cleaning methods and agents.

An object of this invention is to provide an essentially transparent glass mask for photoresist techniques such as are used in making semiconductor electrical devices, wherein the mask embodies a visually transparent or translucent image which is capable of absorbing selected wavelengths of a source of radiant energy.

Another object of this invention is to provide a method for making a completely transparent mask suitable for producing semiconductor electrical devices by photoresist techniques wherein the mask is substantially scratch-resistant, is capable of being easily cleaned, and has a visually translucent image comprised of a material capable of absorbing selected wavelengths particularly in the ultraviolet region, of a source of radiant energy.

Other objects of this invention will, in part, be obvious and will, in part, appear hereinafter.

SUMMARY OF THE INVENTION

In accordance with the teachings of this invention there is provided a visually transparent mask suitable for use in making semiconductor elements by photoresist techniques comprised of a transparent glass substrate having opposed top and bottom surfaces.

A relatively visually transparent image defining a predetermined pattern is at least partially fused into one of the major surfaces. The image is of a translucent or transparent material that has the ability to absorb a selected wavelength portion of the light spectrum, and is of a contrasting color to the substrate so that it can be applied at a precise position on a member to be masked.

DRAWINGS

Figure 4:
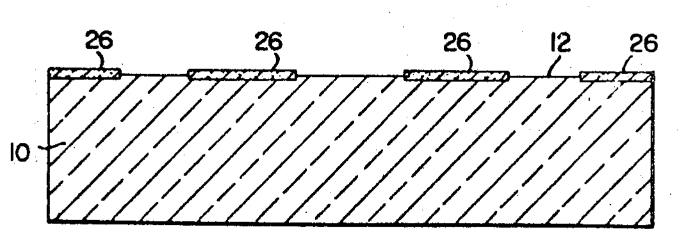
Figure 5:
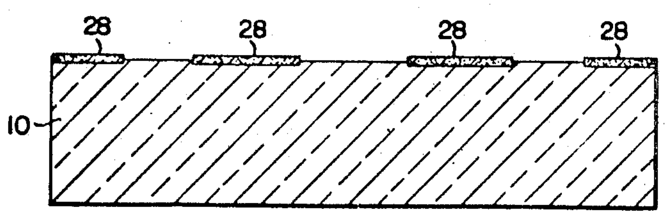
Figure 6:
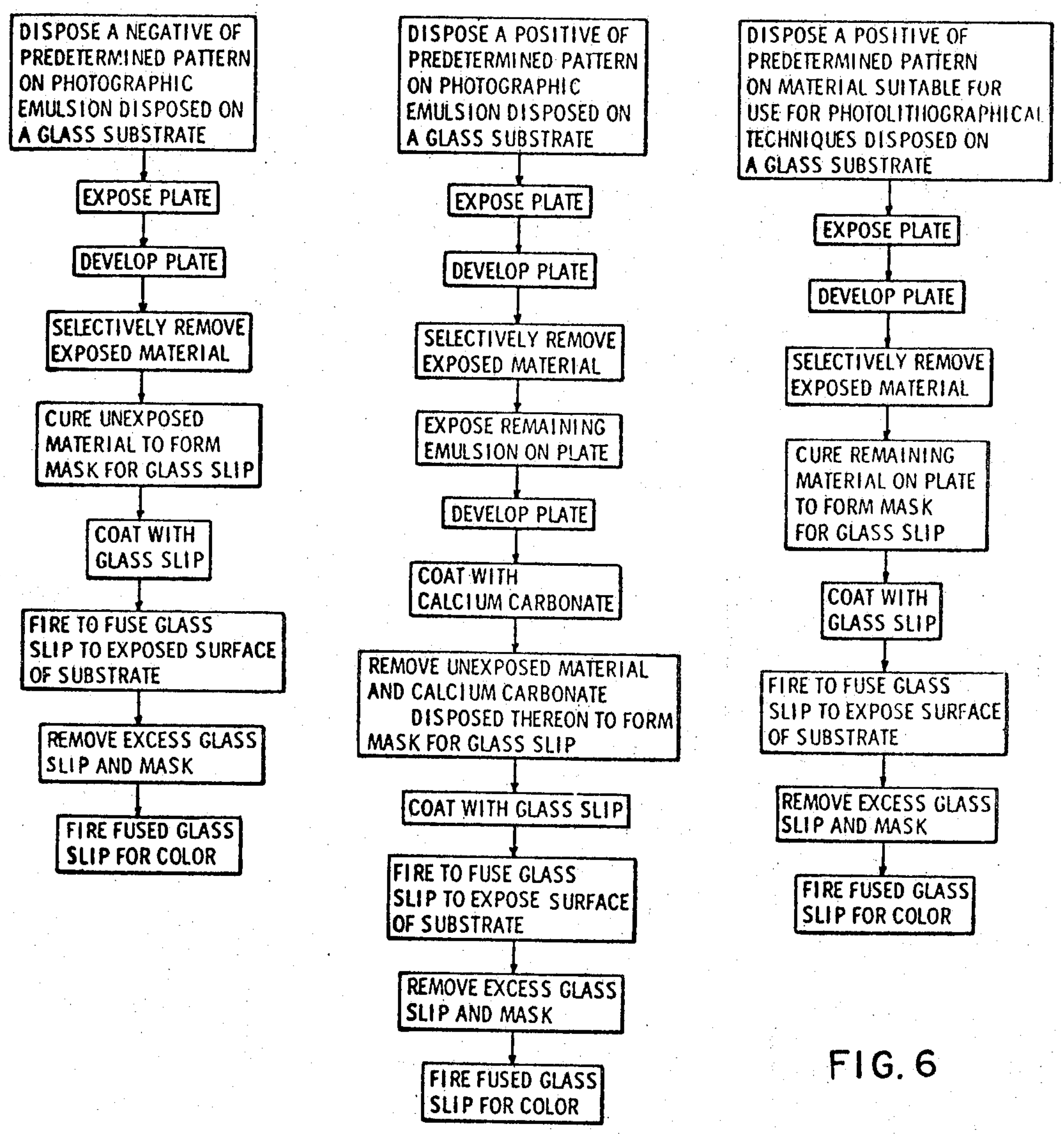

In order to more fully understand the teachings of this invention, reference should be had to the following drawings, in which:

FIGS. 1 through 5 are vertical cross-sectional views of a transparent mask being made in accordance with the teachings of this invention; and FIG. 6 is a flow diagram of processes embodying the teachings of this invention to make a transparent mask.

DESCRIPTION OF THE INVENTION

In accordance with this invention durable, substantially completely transparent masks capable of indefinite reuse and cleaning, for photolithographic process such as are used in making semiconductor devices, comprise a glass substrate, for example, a flat glass plate, having fused into one of its surfaces a visually transparent glass image in a predetermined pattern, the image being of a material capable of absorbing ultraviolet light, and the fused image projecting to a height of about 0.1 micron above the surface to which it is applied and fused to a depth of about 3 microns into the surface. Because of their complete visual transparency such masks can be applied to a semiconductor wafer coated with a photoresist with high precision which is necessary in subjecting the wafer to successive treatments, such as diffusion, oxide growth, epitaxial depositions, metal vaporized films and so forth, in producing integrated circuits and the like therefrom.

It has been discovered that a visually transparent glass or pattern of a material capable of absorbing ultraviolet or another selected portion of the light spectrum may be fused into a visually transparent glass substrate and the combination is suitable for use as a transparent mask in photoresist techniques used in the making of semiconductor elements. The glass image may be formed by applying glass forming materials to selected areas of a surface of a transparent substrate such as a sheet of glass. The glass image may be applied by a silk screening process in which a glass enamel or a glass ink is deposited upon the surface in the desired pattern or design. The enamel or ink is subsequently fired to make the glass image and fuse it at least part way into the glass substrate. Also, a glass slip or stain comprising materials which when fused give the desired pattern may be applied to selective portions of a surface of the transparent glass substrate and subsequently fired to produce the glass image desired.

Photographic resist emulsions have been found to be the most convenient material form to mask the transparent substrate's surface for obtaining the predetermined areas where a transparent image is to be fused thereto. Masking of the substrate surface before applying any glass forming materials thereto in a predetermined pattern, may be accomplished through the use of a coating of calcium carbonate and light sensitive materials suitable for use in photolithographical techniques such, for example, as photographic emulsions, and standard semiconductor photoresist materials. After this calcium carbonate-photoresist coating is applied, it is treated to harden selected portions of the resist coating, the other portions are then washed off having exposed only the areas of the glass substrate on which the pattern is desired.

A glass slip or a stain for use in making the novel masks of this invention consists of suitable metal salts or oxides mixed with an inert material like clay. The clay mixture is thinned with linseed oil, turpentine, glycerine, alcohol, water or combinations thereof. Upon heating below the glass softening temperature, the metal ions from the stain migrate in the rigid glass solution to produce a permanent transparent color which filters out a selected range of wavelength of the light spectrum besides producing the desirable readily detectable image. Silver is a desirable metal ion to impart a yellow to golden brown colored image to aid in orienting the mask on a wafer of semiconductor material. Iron is another desirable metal ion since iron dissolved in glass absorbs ultraviolet radiation.

A suitable glass enamel or a suitable glass ink comprises a powdered ceramic enamel in a suitable liquid vehicle which can be applied to the visibly transparent substrate in the same manner as the enamel and ink is applied to glass containers. On firing the image formed by the enamel or ink is fused to the glass and penetrates into the glass surface. An objection to this use at this time is that many of the enamels and inks are opaque after firing and cause some difficulty in aligning a transparent mask of this invention on a surface of a processed semiconductor wafer. It is desirable and in fact almost necessary that when an image covers a large area that a worker be able to see the wafer of semiconductor material beneath the mask in order to align the mask properly. Therefore only glass slips or stains and inks that are visually transparent should be used. Glass slips upon firing and fusion produce an image which produces this desirable transparent or translucent feature of mask application.

FIGS. 1 to 5 show the steps in a technique for applying to a glass plate a photoresist mask material, treating it to provide a suitable negative pattern, carbonizing the pattern, applying a glass frit, and fusing the frit in the desired pattern.

Shown in FIG. 1 is a transparent substrate 10 such as a glass plate having a top surface 12. Disposed upon the surface 12 is a layer 14 of photographic emulsion. A high resolution photographic emulsion is preferably employed for forming the layer 14. Emulsion coated glass photographic plates are suitable for the substrate 10 and the layer 14. Excellent results have been achieved with Kodak high resolution photographic plates nd high resolution Techni-Glass Plates.

A negative 16 having openings or non-opaque areas 15 corresponding to a pattern of the glass image to be subsequently formed on substrate 10 and opaque areas 17, is placed on the layer 14 and the emulsion coated substrate 10 and the negative 16 are exposed to a light source in the same manner as in taking a photograph. Light which is transmitted through the openings 15 in the negative 16 "fixes" portions 18 of the emulsion it impinges upon, and remaining portions 20 of the emulsion which are under the opaque areas 17 are not exposed to the light and remain "unfixed."

Figure 2:
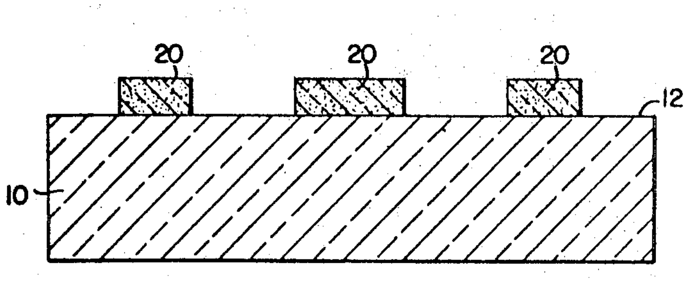

The "fixed" portion of the emulsion is removed from the plate by a suitable preferential solvent. A suitable solvent comprises a solution of copper sulfate, citric acid, and potassium bromide dissolved in aqueous hydrogen peroxide. Such a solution is prepared by dissolving 240 grams of copper sulfate, 300 grams of citric acid, and 15 grams of potassium bromide in 1 gallon of distilled water. This basic solution is then cut to produce a preferential etching solution which may consist of from 1½ to 2 parts by volume of the basic solution with 1 part by volume of hydrogen peroxide (30 volume concentration). The developed plate is placed in the etching solution and slightly agitated for a minimum of approximately four minutes to remove the exposed emulsion 18. Alternately, to assure sharp definition of corners, the plate is etched in an ultrasonically agitated bath of the etching solution for one minute. The resulting structure is as shown in FIG. 2.

The remaining emulsion resist 20 is preferably hardened to prevent later applied glass slip from penetrating the emulsion mask and accidentally fusing to areas of the substrate where it is not desired. One way to do this is to place the substrate 10 and the unexposed emulsion 20 in a solution of sodium sulfate, acetic acid, aluminum potassium sulfate and borax to harden the remaining emulsion 20. The solution may be prepared by dissolving 45 grams of sodium sulfate, and 139 grams of aluminum potassium sulfate in distilled water. To this is added 23 cubic centimeters of 28 percent acetic acid and enough distilled water to make one-half gallon of solution. 30 grams of borax is dissolved in ½ gallon of distilled water. The borax solution is added slowly to the first solution while stirring constantly. Care is to be taken that the mixed solutions not turn milky or cloudy while mixing them together. The emulsion 20 is treated in the solution until it is adequately hardened. Thus Kodak high resolution emulsion is treated for a minimum of 6 minutes in the solution while Techni-Glass high resolution emulsion need only be treated for 1½ minutes in the solution. However, longer treatment times are not detrimental. As stated previously it has been found that this hardening treatment prevents the accidental formation of fused glass images on unwanted surface areas of the substrate 10.

While not necessary, it sometimes is desirable that the substrate 10 and the treated portions 20 of emulsion be rinsed in water and placed in a solution of photographer's hypo such, for example, as Kodak rapid fixer with hardener to clear the gelatin, further assures the prevention of accidental formation of glass images on unwanted surface areas of the substrate 10. For Kodak high resolution emulsion this treatment is from 3 to 5 minutes, while for the Techni-Glass high resolution emulsion a period of from 30 seconds to 1 minute has been found sufficient.

The treatment of portions 20 of the emulsion in the aluminum potassium sulfate, acetic acid, sodium sulfate and borax solution may be omitted and the resulting transparent mask produced by the last-mentioned alternate process has still proven acceptable for subsequent processing fabrication.

After rinsing in water, the substrate 10 with the treated portions 20 therein is placed in a fixer solution comprising sodium thiosulfate prepared by dissolving 250 grams of sodium thiosulfate in one quart of water. A Kodak high resolution emulsion plate is treated for a period of 3 to 5 minutes in the solution while a period of from 2 to 4 minutes has been found suitable for a Techni-Glass high resolution emulsion plate.

The plate, or the substrate 10 with the treated portions 20 are then rinsed in water, preferably containing a wetting agent to promote even drying of the substrate and to prevent streaking. A suitable detergent is one well known to photographers as Kodak Photo-Flo.

The substrate 10 and the treated portions 20 are then placed in an oven and heated to a temperature of from 360° C to 375° C for a sufficient time to carbonize the portions 20 of emulsion. A preferred temperature is 368° C ± 20° C for a period of from 6 to 10 minutes. The substrate 10 is then cooled to room temperature.

Figure 3:
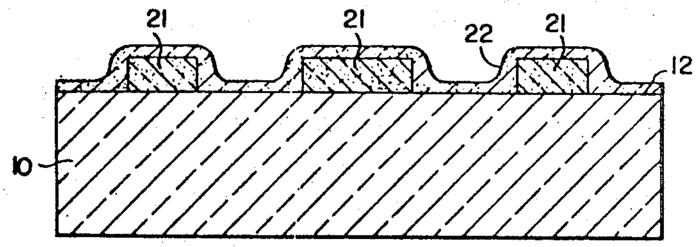

Referring now to FIG. 3 a layer 22 of a glass slip is applied over the carbonized portions 21 and upon the exposed portions of the surface 12 of the substrate 10. The composition of the glass slip and the glass substrate 10 should have closely similar coefficients of expansion to prevent thermal stresses from fracturing the image produced, the substrate 10, or both. The composition of the glass slip must be such as to produce the desired glass image which while visually transparent is capable of absorbing desired wavelengths of light. At the present time in the semiconductor industry as well as in other arts, the photoresist material employed in masking operations for diffusion, selective etching, metallization and the like are all sensitive to ultraviolet radiation. Therefore, the glass slip of the layer 22 must produce a glass for the desired image which will absorb the ultraviolet portion of the light spectrum. Therefore the glass slip of the layer 22 should include a substantial portion of one or more of the elements iron, copper, calcium and silver. A total of from 10 percent to 40 percent may comprise these elements. A suitable glass slip (available from Drakenfeld and is identified as 29–346 Amber Stain) and has a composition as revealed by qualitative analysis of greater than 10 percent iron, about 0.1 percent silicon, 0.1 percent magnesium, about 10 percent copper, 0.05 percent zirconium, 0.05 percent aluminum, about 5 percent calcium, 0.1 percent lead, about 15 percent silver and 0.1 percent zinc. These elements are present as oxides and carbonates. Another suitable glass slip, from the same company and identified as 29-1060, and has a higher percentage of silver namely, 20 to 25 percent. The glass slip layer 22 is applied to the substrate 10 in a sufficient thickness until the layer 22 is opaque. A preferred method is to illuminate the plate with a light below as the slip is being brushed on. It has been found that the thickness of the layer 22 is immaterial provided it is essentially opaque. Too much material in the layer 22 is wasteful.

The applied layer 22 is air dried or dried in an air circulating oven until the layer 22 appears to be white when viewed from the bottom of the substrate 10. The coated substrate 10 is then placed in a furnace and heated to an elevated temperature. An air circulating furnace is preferred. The furnace temperature is 368° C ± 2° C. For the Drakenfeld glass slip 29-1060 the time at temperature is from 6 minutes to 9 minutes with 7 minutes preferred. For the Drakenfeld 29-346 glass slip, the time at temperature is from 10 to 14 minutes with 12 minutes preferred. If a higher temperature of 372° C ± 2° C is employed, the time is reduced to from 3 to 7 minutes for the Drakenfeld 29-1060 glass slip with the preferred time being from 5 to 6 minutes. This heating step is employed to fuse a portion of the glass slip to the exposed surface 12 of the substrate.

Upon cooling to room temperature the treated substrate 10 is washed in water, hot water being preferred, to wash away all glass slip material of the layer 22 not fused to the substrate 10. The substrate 10 is then placed in hot solution of sodium hydroxide or a boiling solution of sodium silicate to remove the carbonized portions 21 from the surface 12. Agitation in any of the solutions for 30 seconds has been found sufficient to remove the portions 20. The resulting structure is as shown in FIG. 4 wherein portions 26 comprise fused material with unfused material of the glass slip trapped within fused portions fusibly bonded to the surface 12 of the substrate 10. The plate is then rinsed in water and dried.

Although a single firing of the transparent masks made from high resolution emulsion photographic plates is adequate, improved results have been obtained when they are heated to 450° C for 5 minutes to achieve the desired condition in the glass pattern image to absorb the ultraviolet portion of the light spectrum. Some transparent masks prepared from high resolution emulsion photographic plates require a second heating to achieve the desired condition in the glass image. The second heating may be for 2 minutes at 500° C or for 5 minutes at 450° C. The finished transparent mask is shown in FIG. 5 with portions 28 forming the glass image desired.

The portions 28 should not be fused too far into the substrate 10 since line definition loss increases with increasing fusion depth into the substrate 10. A fused depth of about 3 microns has been found to be most suitable. The portions 28 should also preferably lie pretty well within the same plane as the surface 12 but a slight protrusion above the surface is tolerable.

The transparent mask of this invention may be used repeatedly without limit. Ordinary dirt may be washed from the surfaces with the usual laboratory glass cleaners. Ordinary superficial scratching is tolerable as long as it does not completely cut through and allow ultraviolet light to penetrate past the image pattern to reach undesired portions of photoresist material during use. Ordinary scratching from normal use of emulsion type masks which rapidly receive them and limited their use are of little consequence with transparent glass mask of this invention. Whereas dirt adheres to metal masks and is hard to remove, and removal often resulting in the rounding of sharp corners and edges, the cleaning of glass masks of this invention withstands any reasonable cleaning cycle far better. For example, some masks made in accordance with the teachings of this invention have been repeatedly used more than 2,500 times with ordinary cleaning and handling.

To illustrate the teachings of this invention a transparent mask was made in the following manner: a Kodak high resolution emulsion photographic plate, 2″ × 2″ was employed to make the mask. The mask was prepared for use in an emitter diffusion process to be employed on a silicon wafer, to enable the fabrication of 21 transistor elements simultaneously. A negative of the desired pattern image was placed on the emulsion of the photographic plate and the plate was exposed to ultraviolet light for 3 seconds. The exposed plate was developed in a photographic developer for 3 minutes and rinsed in water at 68° F for approximately 3 minutes. The plate was placed in an etching bath consisting of one part by volume of hydrogen peroxide and 2 parts by volume of a copper sulfate, citric acid, and potassium solution, the composition being described heretofore. The plate was slightly agitated in the solution for 4 minutes and then placed in an ultrasonically agitated solution of the same for 1 minute. The plate was then rinsed in water for 2 minutes. All the exposed emulsion had been removed by the solution treatments.

The plate was then placed in a solution of borax, aluminum potassium sulfate, acetic acid, and sodium sulfate of the composition described heretofore. The plate was allowed to soak in the solution for 6 minutes and then removed and placed in a solution of sodium thiosulfate described heretofore for a period of 4 minutes. The plate was then rinsed in water containing a wetting agent and dried. The remaining emulsion on the glass plate was clear.

The processed plate was placed in an open tube furnace and heated to 368° C ± 2° C for 8 minutes. The plate was removed and cooled to room temperature. The emulsion remaining in the glass had been carbonized.

The plate was placed in a jig, carbonized emulsion side up, with a light source beneath. A glass stain comprising a glass frit, suspended in water was sprayed onto the surface of the plate having the carbonized emulsion until the applied layer of glass frit was opaque to a light source. The coated plate was placed in an air circulating oven at 60° C for 30 minutes to drive the water from the glass frit. Upon removal from the oven the glass frit appeared dirty white or slightly gray when viewed from the bottom of the plate.

The coated plate was then placed in an open tube furnace and heated to 368° C for 8½ minutes. The plate was cooled to room temperature and washed in a hot water bath to remove the excess stain or glass frit from the plate and dried. Removal of the excess glass frit was aided by scrubbing the surface with a brush. The exposed surface area of the plate was covered with an adherent coating of the stain or glass frit adhering to the exposed surface. The plate was then placed in a solution of hot sodium hydroxide to remove the carbonized emulsion and any glass frit adhering thereon. The plate was rinsed and dried. The plate was refired at 500° C ± 10° C in the open tube furnace for 2 minutes and then cooled to room temperature. The glass image had a deep amber color and was transparent.

The transparent mask was then used to process 3,168 wafers of silicon for emitter diffusion process step. When required the transparent glass mask was cleaned with a laboratory glassware cleaner. This and other glass masks gave excellent results and outlasted ordinary emulsion by a factor of from 50 to 125 and better.

Various cleaning agents were then tried on the transparent substrate. Ordinary powdered household cleansers used for cleaning sinks produced microscratches when applied to the mask, but did not appear to affect the mask's function. The only objection to the use of ordinary oven cleaners was that a subsequent cleaning step was required to remove a film left behind by use of the oven cleaners. Line definition of the image pattern was maintained throughout.

The plate was sectioned and when examined, the glass image was found to be fused into the glass substrate to a depth of about 2.5 microns and projected above the surface of the substrate a height of 750A.

An alternate method of employing photographic plates to produce masks is to expose a coated plate to a positive of the image to be produced. The photographic plate is processed as above indicated except that immediately after washing the exposed emulsion from the plate, the remaining unexposed emulsion is exposed and developed, and the entire surface of the plate is covered with a thin layer of a paste of calcium carbonate (chalk). The paste is made by mixing finely powdered calcium carbonate in water and heating the resulting suspension until a paste is formed. The coated plate is dried and placed in 90 percent aqueous hydrogen peroxide. The developed emulsion with the superposed portion of the calcium carbonate applied thereto is removed from the plate by this treatment. However the calcium carbonate layer still remains on the portions of the glass substrate which are not protected by the exposed and developed emulsion. Starting with the application of the glass slip, the plate is then processed as before to obtain the transparent image. The chalk or calcium carbonate is removed by agitation in hot water before firing at 500° C for the desired color of the image.

Transparent glass masks have been made by employing standard photoresist materials such, for example, as Kodak Metal Etch Resist and Shipley's resist, both well known to those in the semiconductor element processing art. A positive of the image to be formed in the glass substrate is placed on the photoresist and exposure is made to ultraviolet light. Using these resists, the unfixed photoresist material is selectively etched away and the fixed photoresist is cured by heating. It has been discovered that some of the resist materials apparently polymerize and may be slightly harder to remove later although they do form a mask against the glass slip adhering at undesired places. A mixture of 2 parts photoresist to 1 part the chalk resist provides an adequate mask with freedom from flaking. The application and firing of the glass slip is the same as set out before. The cured photoresist is removed prior to firing the fused image for the desired form necessary for absorbing the selected wavelength of the light spectrum.

The transparent masks made in accordance with the teachings of this invention have several advantages over the prior masks. The essentially completely transparent masks permit more accurate slignment of successive overlay patterns in semiconductor element making. The transparent masks resist scratching, are easily cleaned and have a very extended lifetime when compared with the prior art masks. The prior art emulsion masks are easily damaged or destroyed and may be employed only from a few to a maximum of 100 times. They are easily scratched and when dirty from photoresist pickup or dirt from the work area, they cannot be easily cleaned and their usefulness is destroyed. Prior art metal masks are more durable than prior art emulsion masks but they too can be easily scratched and thereby be rendered useless for their designed function. However, photoresist buildup in corners and accumulation of other dirt on the mask is removed only by tedious work. Removal of photoresist from corners of metal masks results in the gradual enlargement of the image and rounding of corners, with poorer resolution.

Additionally, spikes which are produced in epitaxial growth processes and which severely damage emulsion masks and which require careful use of metal masks as well have no apparent detrimental effect on the transparent masks of this invention.

The mask of this invention is employed in the conventional photo-masking techniques known to those skilled in the art. Such techniques are set forth in *Integrated Circuit Design Principles and Fabrication*, Editors R. M. Warner and J. N. Fordemwalt, McGraw-Hill, 1965, Pages 133, 150–154, 288, 298–305 and 323–324.

I claim as my invention:

1. A durable mask capable of repeated reuse in photolithographic processes such as are used in making semiconductor elements, comprising a visually transparent glass substrate having at least two major surfaces substantially parallel to each other; and an image defined by a predetermined pattern which pattern is fused into one major surface of the substrate, the pattern comprising a material having the property of absorbing at least a selective wavelength portion of the light spectrum, the pattern projecting about 0.1 micron above the surface to which it is applied, and being fused into the surface to a depth up to about 3 microns.

2. The durable mask of claim 1 wherein the predetermined pattern is a glass.

3. The durable mask of claim 1 wherein the predetermined pattern is visually transparent.

4. The durable mask of claim 1 wherein the predetermined pattern is of a material that has the ability to absorb the ultraviolet portion of the light spectrum.

5. The durable mask of claim 3 wherein the predetermined pattern is of a material that has the ability to absorb the ultraviolet portion of the light spectrum.

6. The mask of claim 5 wherein the predetermined pattern is fused to a depth of approximately 2.5 microns into the substrate and projects approximately 750A units above a major opposed surface.

* * * * *